(12) United States Patent
Corston-Oliver et al.

(10) Patent No.: US 7,269,594 B2
(45) Date of Patent: *Sep. 11, 2007

(54) SYSTEM FOR IMPROVING THE PERFORMANCE OF INFORMATION RETRIEVAL-TYPE TASKS BY IDENTIFYING THE RELATIONS OF CONSTITUENTS

(75) Inventors: Simon H. Corston-Oliver, Seattle, WA (US); William B. Dolan, Redmond, WA (US); Hisami Suzuki, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 249 days.

This patent is subject to a terminal disclaimer.

(21) Appl. No.: 10/957,973

(22) Filed: Oct. 4, 2004

(65) Prior Publication Data

US 2005/0043936 A1 Feb. 24, 2005

Related U.S. Application Data

(62) Division of application No. 09/336,200, filed on Jun. 18, 1999, now Pat. No. 6,901,402.

(51) Int. Cl.
*G06F 17/30* (2006.01)
(52) U.S. Cl. .............. 707/101; 707/2; 707/3; 707/102; 707/103 Y; 707/104.1
(58) Field of Classification Search .......... 707/3, 707/10, 4, 5, 6, 7, 2, 101, 102, 103 Y, 104.1; 704/9

See application file for complete search history.

(56) References Cited

U.S. PATENT DOCUMENTS

| | | | |
|---|---|---|---|
| 4,849,898 A | 7/1989 | Adi | 364/419 |
| 5,265,065 A | 11/1993 | Turtle | 707/1 |
| 5,331,556 A | 7/1994 | Black, Jr. et al. | 364/419.08 |
| 5,418,951 A | 5/1995 | Damashek | 707/5 |
| 5,619,410 A | 4/1997 | Emori et al. | 395/757 |
| 5,893,102 A | 4/1999 | Maimone et al. | 707/101 |
| 5,946,499 A | 8/1999 | Saunders | 395/813 |
| 5,966,686 A | 10/1999 | Heidorn et al. | 704/9 |
| 5,991,754 A * | 11/1999 | Raitto et al. | 707/2 |
| 5,995,922 A | 11/1999 | Pentheroudakis et al. | 704/9 |

(Continued)

FOREIGN PATENT DOCUMENTS

| | | |
|---|---|---|
| WO | WO92/02890 | 2/1992 |
| WO | WO98/25217 | 6/1998 |

(Continued)

OTHER PUBLICATIONS

Office Action dated Sep. 11, 2006 for U.S. Appl. No. 10/957,974, filed Oct. 4, 2004.

(Continued)

*Primary Examiner*—Thuy N. Pardo
(74) *Attorney, Agent, or Firm*—Westman, Champlin & Kelly, P.A.

(57) ABSTRACT

A system is utilized for determining a relationship between first and second textual inputs. The system identifies constituents in the first textual input, having predetermined characteristics indicative of usefulness in determining the relationship. The relationship is then determined based on the constituents identified. The constituents can be eliminated from the first textual input, weighted in the first textual input, or simply annotated in one of a variety of ways.

8 Claims, 11 Drawing Sheets

U.S. PATENT DOCUMENTS

| | | | |
|---|---|---|---|
| 6,006,221 A | 12/1999 | Libby et al. | 707/5 |
| 6,076,051 A | 6/2000 | Messerly et al. | 704/9 |
| 6,374,209 B1* | 4/2002 | Yoshimi et al. | 704/9 |
| 6,556,964 B2 | 4/2003 | Haug et al. | 704/9 |

OTHER PUBLICATIONS

Amendment filed Dec. 11, 2006 for U.S. Appl. No. 10/957,974, filed Oct. 4, 2004.

Office Action dated Nov. 29, 2006 for U.S. Appl. No. 10/979,532, filed Nov. 2, 2004.

Office Action dated Nov. 29, 2006 for U.S. Appl. No. 10/979,299, filed Nov. 2, 2004.

J. Maling, "Of Nominative and Accusative: The Hierarchical Assignment of Grammatical Case in Finnish", by A. Holmberg and V. Nikanne, *Case and Other Topics in Finnish Syntax*, Studies in Generative Grammar, Foris (1992), pp. 51-76.

"Grammatical Relations and Surface Cases", by Masyoshi Shibatani, *Language*, vol. 53, No. 4 (1977), pp. 789-809.

Losee, R. M. "Learning Syntactic Rules and Tags With Genetic Algorithms for Information Retrieval and Filtering: An Empirical Basis for Grammatical Rules", Information Processing & Management, vol. 32, No. 2 pp. 185-197, Mar. 1, 1996.

* cited by examiner

SYSTEM FOR IMPROVING THE PERFORMANCE OF INFORMATION RETRIEVAL-TYPE TASKS BY IDENTIFYING THE RELATIONS OF CONSTITUENTS

REFERENCE TO COPENDING APPLICATION

This is a divisional of application Ser. No. 09/336,200, filed Jun. 18, 1999 now U.S. Pat. No. 6,901,402.

Reference is hereby made to co-pending U.S. patent application Ser. No. 09/220,836 filed Dec. 24, 1998 entitled "SYSTEM FOR IMPROVING THE PERFORMANCE OF INFORMATION RETRIEVAL-TYPE TASKS BY IDENTIFYING CLAUSES HAVING PREDETERMINED CHARACTERISTICS" and assigned to the same assignee as the present application.

INCORPORATION BY REFERENCE

The following patent applications are hereby fully incorporated by reference:

Co-pending U.S. patent application entitled "METHOD AND SYSTEM FOR COMPUTING SEMANTIC LOGICAL FORMS FROM SYNTACTIC TREES", filed Jun. 28, 1996 and assigned Ser. No. 08/674,610; and U.S. patent application entitled "INFORMATION RETRIEVAL UTILIZING SEMANTIC REPRESENTATION OF TEXT", filed Mar. 7, 1997 and assigned Ser. No. 08/886,814, both of which have been assigned to the present assignee.

BACKGROUND OF THE INVENTION

The present invention is directed to a system for determining a relationship (such as similarity in meaning) between two or more textual inputs. More specifically, the present invention is directed to a system which performs improved information retrieval-type tasks by identifying relations of constituents of documents being searched.

The present invention is useful in a wide variety of applications, such as many aspects of information retrieval including indexing, pre-query and post-query processing, document similarity/clustering, document summarization, natural language understanding, etc. However, the present invention will be described primarily in the context of information retrieval, for illustrative purposes only.

Generally, information retrieval is a process by which a user finds and retrieves information, relevant to the user, from a large store of information. In performing information retrieval, it is important to retrieve all of the information a user needs (i.e., it is important to be complete) and at the same time it is important to limit the irrelevant information that is retrieved for the user (i.e., it is important to be selective). These dimensions are often referred to in terms of recall (completeness) and precision (selectivity). In many information retrieval systems, it is important to achieve good performance across both the recall and precision dimensions.

In some current retrieval systems, the amount of information that can be queried and searched is very large. For example, some information retrieval systems are set up to search information on a global computer network (such as the Internet), digital video discs, and other computer data bases in general. The information retrieval systems are typically embodied as, for example, Internet search engines and library catalog search engines. Further, even within the operating system of a conventional desktop computer, certain types of information retrieval mechanisms are provided. For example, some operating systems provide a tool by which a user can search all files on a given data base or on a computer system based upon certain terms input by the user.

Many information retrieval techniques are known. A user input query in such techniques is typically presented as either an explicit user generated query, or an implicit query, such as when a user requests documents which are similar to a set of existing documents. Typical information retrieval systems search documents in a larger data store at either a single word level, or at a term level. Each of the documents is assigned a relevance (or similarity) score, and the information retrieval system presents a certain subset of the documents searched to the user, (typically that subset which has a relevance score which exceeds a given threshold).

The rather poor precision of conventional statistical search engines stems from their assumption that words are independent variables (i.e., words in any textual passage occur independently of each other). Independence in this context means that a conditional probability of any one word appearing in a document given the presence of another word therein is always zero (i.e., a document simply contains an unstructured collection of words or simply put "a bag of words").

As one can readily appreciate, this assumption, with respect to any language, is grossly erroneous. Words that appear in a textual passage are simply not independent of each other. Rather, they are highly inter-dependent.

Keyword based search engines totally ignore this fine-grained linguistic structure. For example, consider an illustrative query expressed in natural language: "How many hearts does an octopus have?" A statistical search engine, operating on content words "hearts" and "octopus", or morphological stems thereof, might likely return or direct a user to a stored document that contains a recipe that has as its ingredients and hence its content words: "artichoke hearts, squid, onion and octopus". This engine, given matches in the two content words, may determine, based on statistical measures, that this document is an excellent match. In reality, the document is quite irrelevant to the query.

The art also teaches various approaches for extracting elements of syntactic phrases which are indexed as terms in a conventional statistical vector-space model. One example of such an approach is taught in J. L. Fagan, "Experiments in Automatic Phrase Indexing for Document Retrieval: A Comparison of Syntactic and Non-Syntactic Methods", Ph.D. Thesis, Cornell University, 1988, pp. 1-261. Another such syntactic based approach is described, in the context of using natural language processing for selecting appropriate terms for inclusion within search queries, in T. Strzalkowski, "Natural Language Information Retrieval: Tipster-2 Final Report", *Proceedings of Advances in Text Processing: Tipster Program Phase 2*, Darpa, 6-8 May 1996, Tysons Corners, Va., pp. 143-148; and T. Strzalkowski, "Natural Language Information Retrieval", *Information Processing and Management*, Vol. 31, No. 3, 1995, pp. 397-417. A further syntactic-based approach of this sort is described in B. Katz, "Annotating the World Wide Web Using Natural Language", *Conference Proceedings of R.I.A.O. 97, Computer-Assisted Information Search on Internet,* McGill University, Quebec, Canada, 25-27 Jun. 1997, Vol. 1, pp., 135-155.

These syntactic approaches have yielded lackluster improvements, or have not been feasible to implement in natural language processing systems available at the time. Therefore, the field has moved away from attempting to directly improve the precision and recall associated with the results of a query, to improvements in the user interface.

Another problem is also prevalent in some information retrieval systems. For example, where documents are indexed, such as in a typical statistical search engine, the index can be very large, depending upon the content set, and number of documents to be indexed. Large indices not only present storage capacity problems, but can also increase the amount of time required to execute a query against the index.

The term "grammatical relations" is used to denote subject, object, and other constituents that can be identified on the basis of a syntactic analysis. Linguists recognize that grammatical relations are not all of equal status. For example, Keenan and Comrie have developed a summary of how different languages mark positions in a domain of relativization which are assumed by noun phrases. The summary is referred to as the Accessibility Hierarchy (or hierarchy of accessibility) and is described as follows.

Topic (optional)>subject>direct object>indirect object>object of preposition or post position>genitive (possessor)>object of comparison.

The hierarchy of accessibility illustrates a generalization that the lower a noun phrase is on the hierarchy, the less likely it is that this noun phrase will be expressed by a relative pronoun.

The accessibility hierarchy, and how it is obtained, is described in greater detail in "Language Typology and Syntactic Description, Complex Constructions", Chapter 3, written by Edward L. Keenan, edited by Timothy Chopin, 1985; and Keenan, E. L. and B. Comrie, "N.P. Accessibility and Universal Grammar", Linguistic Inquiry 8: 63-100 (1977).

It is also worth noting that some languages make extensive use of what linguists broadly refer to as "cases". The English language still contains vestiges of an earlier case system. For example, in the pronominal system, the English language distinguishes subject versus object versus genitive with terms such as he, him and his. While linguists have devoted a great deal of time and effort in attempting to distinguish case from thematic role from other kinds of marking, the term case, as discussed herein, is used in the following two senses:

1. To describe morphological inflection, which typically involves changing the endings of words. German, Russian and Latin are examples of languages which exhibit morphological case.

2. To describe the use of adpositions (prepositions and postpositions) or particles to indicate the grammatical role of a noun phrase. Japanese and Indonesian are examples of languages which exhibit case information of this type. A discussion of grammatical relations and surface case is set out in Shibatani, "Grammatical Relations and Surface Cases", Language, Volume 53, Number 4 (1977) pp. 789-809. Also, a discussion of grammatical function and morphological case is set out in Maling, "Of Nonminitive and Accusative: The Hierarchical Assignment of Grammatical Case in Finnish", this article is published in A. Holenberg and U. Nikanne, *Case and Other Topics in Finnish Syntactic, Studies in Generative Grammar*, Foris (1992), pp. 51-76. In this patent, the term "relations" will be used to refer to both cases and grammatical relations.

SUMMARY OF THE INVENTION

One aspect of the present invention is related to the realization that relations are also generally indicative of the importance of a term or constituent in determining what a sentence or document is about. For example, the higher the term is in the accessibility hierarchy, the more important it is to the meaning of the sentence or document in which it exists. Similarly, certain case markings can indicate such importance. This can be extremely helpful in information retrieval type tasks.

A system is utilized for determining a relationship between first and second textual inputs. The system identifies relations of (i.e., case information associated with, or grammatical relations of) constituents in the first textual input. The relationship between the first and second textual inputs is then determined based on the relations identified. The grammatical relations can be determined based on the Accessibility Hierarchy. For example, constituents below a hierarchy threshold, determined based on the grammatical relations, can be eliminated from the first textual input, weighted in the first textual input, or simply annotated. Similarly, constituents being marked by certain case information can be eliminated from the first textual input, weighted, or simply annotated.

One embodiment of the invention includes a test methodology which is used in identifying the hierarchy and hierarchy threshold or the relevant case markings. The test methodology can be used across a wide variety of content sets, in order to customize the present invention for use with the various content sets.

BRIEF DESCRIPTION OF THE DRAWINGS

FIG. 3A is a functional block diagram illustrating operation of one aspect of the present invention, in accordance with one illustrative embodiment thereof.

DETAILED DESCRIPTION OF THE ILLUSTRATIVE EMBODIMENTS

Overview

The present invention utilizes grammatical relations of terms or phrases (constituents) in a first textual input in order to determine the meaning or "aboutness" of the first textual input. In accordance with one illustrative embodiment of the present invention, a hierarchy of grammatical relations is identified wherein grammatical relations falling below a predetermined hierarchy level or threshold are not particularly helpful in determining the aboutness of the first textual input. In another illustrative embodiment, case information is identified which indicates that constituents corresponding to that case information are not particularly helpful in determining the aboutness of the first textual input. For purposes of this discussion, the term "relations" is used to refer to both grammatical relations and cases. While the present invention is contemplated for use in a wide variety of applications, it is described herein primarily in the context of information retrieval, for the purpose of illustration only. In that context, the constituents which have been identified can be removed from the first textual input prior to an indexing operation to greatly reduce the size of the index. This can be accomplished without significantly impacting either precision or recall during the information retrieval process. The present invention also includes a system for obtaining a list of the types of constituents to be identified in identifying the relevant case information or in setting the hierarchy and hierarchy threshold, certain data structures and systems for generating those data structures.

Figure 1:
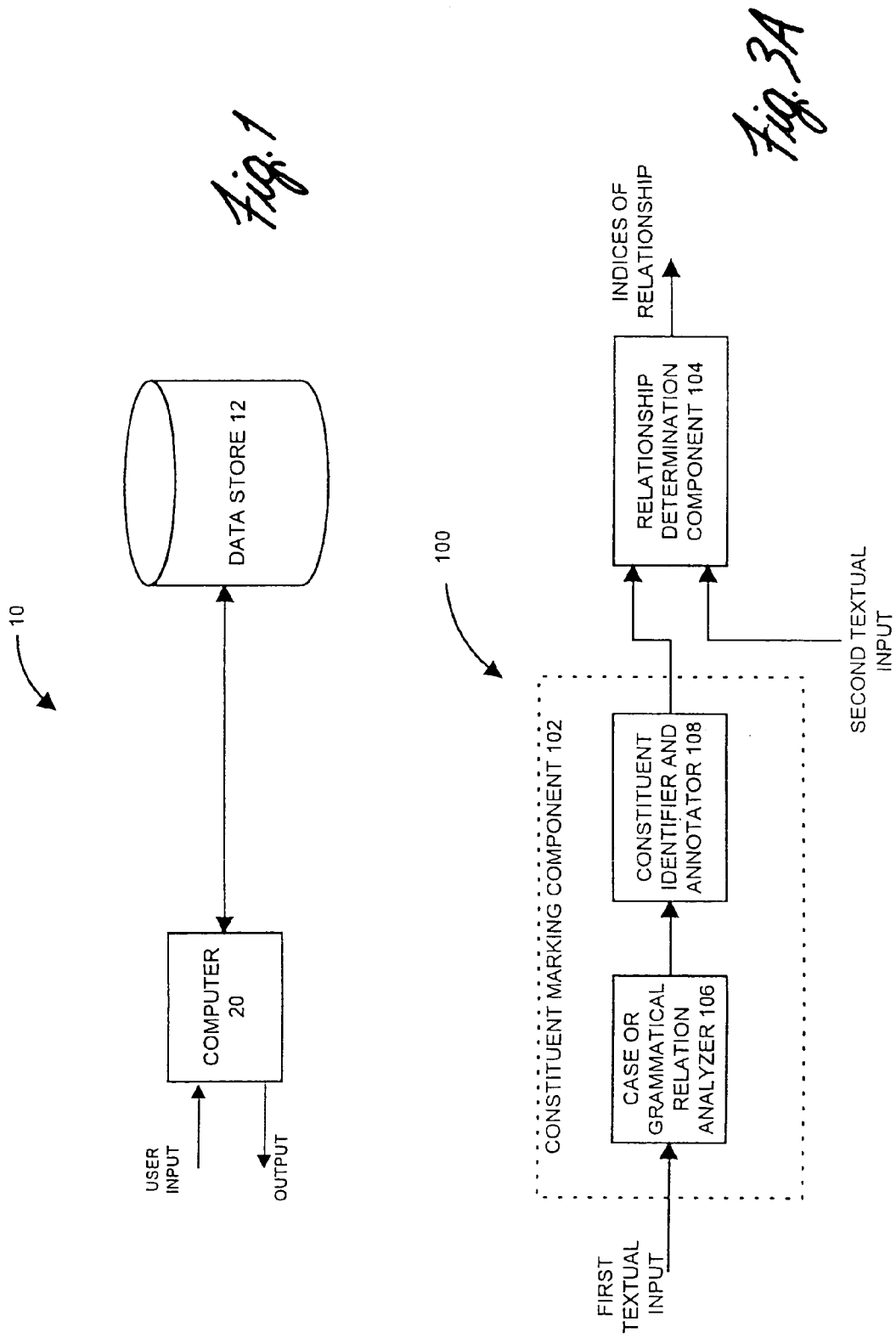
FIG. 1 is a high level block diagram of an illustrative system in which the present invention can be used.

FIG. 1 depicts a very high-level block diagram of computer system 10 in accordance with one illustrative embodiment of the present invention. Computer system 10 includes data store 12 coupled to computer 20. It should be noted that data store 12 can be any suitable type of storage which is either internal to, or external to, computer 20. Similarly, data store 12 can be coupled to computer 20 through any suitable means, such as through direct cabling, a dial-up modem connection (such as when data store 12 corresponds to memory accessible over a global computer network such as the Internet), or any other suitable connection. Similarly, computer 20 is illustratively any suitable computer for accessing data store 12, and is referred to hereinafter as a personal computer which is described in greater detail with respect to FIG. 2.

Computer 20 includes user interface devices (such as a keyboard and monitor) so that a user can provide a user input to computer 20 in order to request that computer 20 perform certain operations on data store 12.

The user input can be a request to perform an information retrieval operation. In that case, the user input is typically a query and computer 20 executes the query against data store 12 to locate documents which are relevant to the query input by the user. Computer 20 determines a relationship between the first textual input (which is the query) and a second textual input (which is one or more of the documents under consideration or indexed records of those documents) and identifies those documents which have a close relationship (such as those documents which are similar in meaning) to the query and provides the identification of those documents, or the documents themselves, as an output to the user.

The user input can also be an implicit type of information retrieval request. In that case, the user typically presents a document or other textual input and requests computer 20 to execute a "FIND SAME" type of operation in which computer 20 locates documents on data store 12 which are similar to the textual input provided by the user. Computer 20 then provides either an identification of the documents located in response to the "FIND SAME" request, or the documents themselves.

Similarly, the user input can include a request to cluster documents, in which case computer 20 examines a plurality of documents on data store 12 and clusters like documents in the same clusters. In doing so, computer 20 determines a relationship (such as similarity in meaning) between the various documents and places those documents which are closely related to one another in the same cluster.

The user input can also be a request that computer 20 summarize one or more documents contained in data store 12. In that instance, computer 20 examines the documents under consideration and develops an output to the user which is indicative of the meaning or "aboutness" of the document being summarized.

In all of the above instances, it should be noted that the operations described can either be carried out across a network (either a local area network or a wide area network) or they can be carried out within a single computer (such as where the operating system provides a searching tool which can be used to search the memory of the computer on which the operating system is running).

Figure 2:
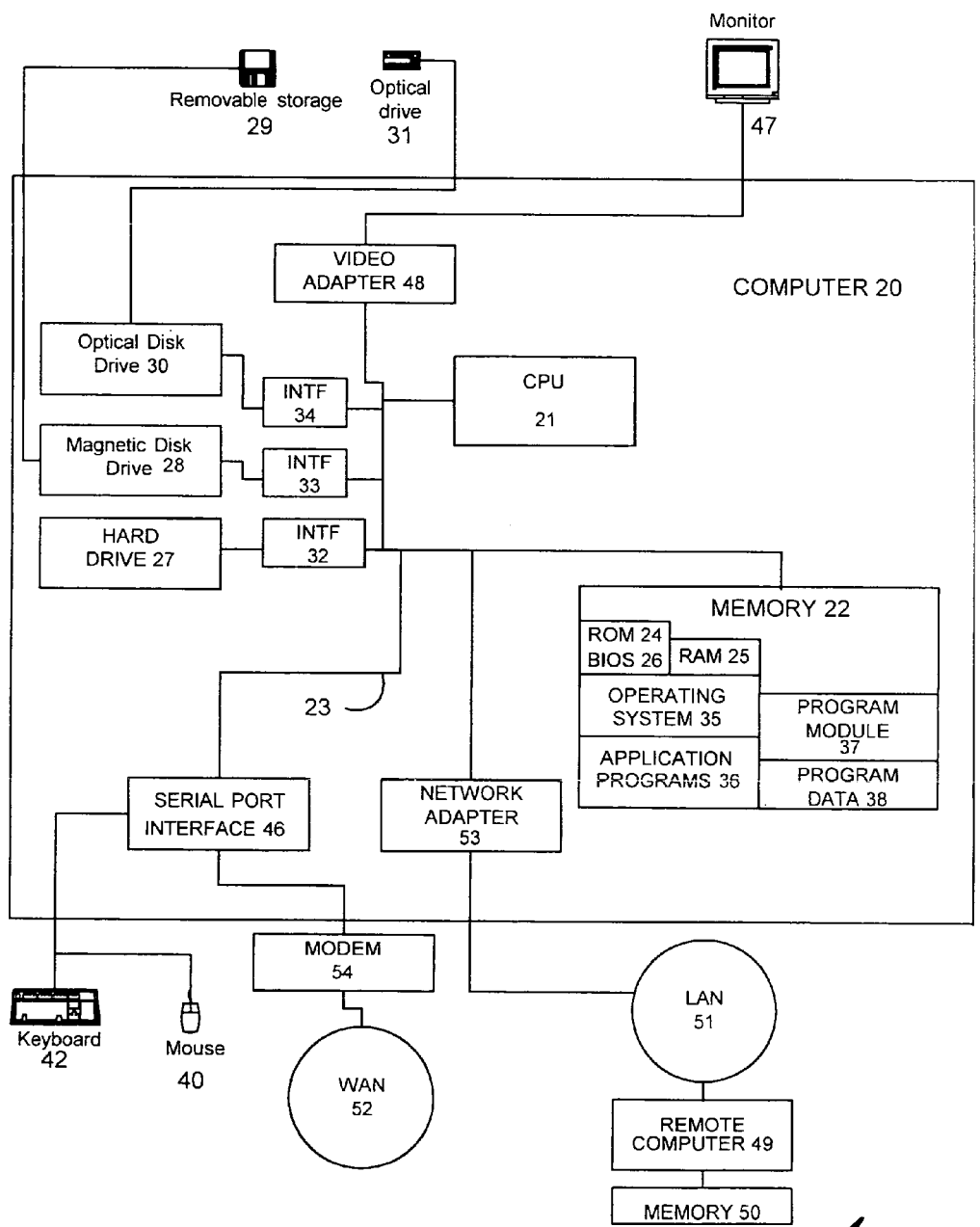
FIG. 2 is a block diagram of one embodiment of a computer in accordance with one aspect of the present invention.

FIG. 2 is a more detailed block diagram of computer 20 in accordance with one illustrative embodiment of the present invention. FIG. 2 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including handheld devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

In FIG. 2, an exemplary system for implementing the invention includes a general purpose computing device in the form of a conventional personal computer 20, including processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 a random access memory (RAM) 25. A basic input/output 26 (BIOS), containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 45 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices such as a speaker and printers (not shown).

The personal computer 20 may operate in a networked environment using logic connections to one or more remote computers, such as a remote computer 49. The remote computer 49 may be another personal computer, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local are network (LAN) 51 and a wide area network (WAN) 52. Such networking environments are commonplace in offices, enterprise-wide computer network intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used.

Identifying Relations

FIG. 3A is a functional block diagram of a text processing system 100 in accordance with one illustrative embodiment of the present invention. The components in system 100 can be implemented based on program modules or instructions stored in any suitable memory associated with, or accessible by, computer 20. Further, the components can be implemented in processor 21, a co-processor, or a dedicated processor.

Text processing system 100 includes constituent marking component 102 and relationship determination component 104. Constituent marking component 102 receives a first textual input and identifies constituent types and associated case information or grammatical relations of the constituents in the first textual input, which are described in greater detail below. When case information is identified, the associated constituents are annotated so they can be compared against predetermined case information during later processing. When grammatical relations are identified, the constituents are annotated so that they can be ranked during later processing.

When grammatical relations are identified, the annotated constituents and grammatical relations are provided, in one illustrative embodiment, as a syntactic parse tree or other syntactic analysis, to relationship determination component 104, although other types of analysis which identify grammatical relations of constituents can be used as well. When case information is identified, the associated constituent can simply be provided with an annotation which is indicative of the relation.

In an embodiment in which system 100 is being used to determine the relationship between two or more textual inputs, relationship determination component 104 determines a relationship between the first textual input, as represented by the syntactic analysis or annotated constituents output by marking component 102 and a second textual input provided to component 104. Component 104 provides an indication of the relationship at its output.

In order to identify and annotate the constituents, marking component 102 includes case or grammatical relation analyzer 106, and constituent identifier and annotator 108. The first textual input is provided to analyzer 106. In one illustrative embodiment, in which case information is to be obtained, analyzer 106 includes a word breaker (e.g., for Japanese) and an analyzer which determines where case marking occurs. In another embodiment in which morphological case information is to be identified (e.g., German), analyzer 106 includes a part-of-speech analyzer and a morphological analyzer which analyzes words for morphological inflections. The constituents with associated case information are provided as an output to constituent identifier and annotator 108.

In another illustrative embodiment, analyzer 106 simply includes a sentence breaker which examines the first textual input provided thereto and breaks the document along sentence boundaries. The sentences are provided to a syntactic and semantic analyzer (also included in grammatical relation analyzer 106) which identifies parts of speech (such as noun and verb), constituents (such as noun phrases and verb phrases), and grammatical relations (such as subjects and objects), and provides an output based on a syntactic analysis which corresponds to the sentence received by the syntactic and semantic analyzer. It should be noted that any other suitable mechanism which identifies grammatical relations among constituents can be used as well.

The syntactic analysis or other output (such as constituents with case information) is provided to constituent identifier and annotator 108. It should also be noted that grammatical analyzer 106 can be a more complicated system which includes other morphological analysis, or other natural language processing techniques as well.

For example, in accordance with one more specific illustrative embodiment of the present invention, the syntactic and semantic analyzer in grammatical relation analyzer 106 receives a single line of input text at any given time, whether it be a sentence in a document or a text fragment and constructs a syntactic analysis which serves as input to the remainder of the grammatical relation analyzer 106. In one illustrative example, where documents are being analyzed, in order to facilitate natural language processing which operates on a single sentence at a time, the text for each document is broken into a text file using a conventional sentence breaker in which each sentence occupies a separate line in the file. For each input text line, the line is first parsed into its constituent words. Thereafter, using a predefined record in a stored lexicon, for each word, the corresponding records for these constituent words (through predefined grammatical rules) are themselves combined into larger structures or analyses which are then, in turn, combined (again through predefined grammatical rules) to form even larger structures, such as a syntactic parse tree. Whether a particular rule will be applicable to a particular set of constituents is governed, in part, by the presence or absence of certain corresponding attributes and their values in the word records.

An illustrative lexicon includes approximately 165,000 head word entries. This lexicon includes various classes of words (such as, e.g., prepositions, conjunctions, verbs, nouns, operators and qualifiers) that define syntactic and semantic properties inherent in the words in an input string so that a parse tree can be constructed therefore. Clearly, a syntactic parse tree can be precomputed while a corresponding document is being indexed and stored within a record for that document for subsequent access and use, rather than being computed later once that document has been retrieved in response to a query.

In one particular illustrative embodiment of grammatical analyzer 106, an input string, such as the sentence "The octopus has three hearts." is first morphologically analyzed, using the predefined record in the lexicon for each of its constituent words, to generate a so-called "stem" (or "base") form. Stem forms are used in order to normalize differing word forms (e.g., verb tense and singular-plural noun variations) to a common morphological form for use by a parser. Once the stem forms are produced, the input string is syntactically analyzed by the parser, using the grammatical rules and attributes in the records of the constituent words, to yield the corresponding syntactic parse tree. This tree depicts the structure of the input string, specifically each word or phrase (e.g. noun phrase "The octopus") in the input string, a category of its corresponding grammatical function (e.g., NP for noun phrase) and link(s) to each syntactically related word or phrase therein. For the illustrative sentence, its associated syntactic parse tree would be:

TABLE 1

SYNTACTIC PARSE TREE
for "The octopus has three hearts."

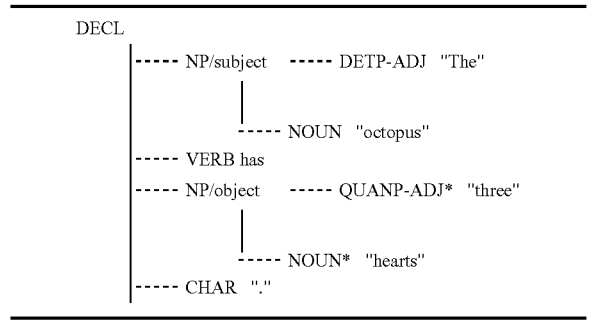

A start node located in the upper-left hand corner of the tree defines the type of input string being parsed. Sentence types include "DECL" (as here) for a declarative sentence, "IMPR" for an imperative sentence and "QUES" for a question. Displayed vertically to the right and below the start node is a first level analysis. This analysis has a head node indicated by an asterisk (or other suitable marker), typically a main verb (here the word "has"), a premodifier (here the noun phrase "The octopus"), followed by a postmodifier (the noun phrase "three hearts"). Each leaf of the tree contains a lexical term or a punctuation mark. Here (as labels), "NP" designates a noun phrase, and "CHAR" denotes a punctuation mark.

About this and subsequent levels of processing, the reader is referred to co-pending U.S. patent applications entitled "METHOD AND SYSTEM FOR COMPUTING SEMANTIC LOGICAL FORMS FROM SYNTACTIC TREES", filed Jun. 28, 1996 and assigned Ser. No. 08/674,610, and "INFORMATION RETRIEVAL UTILIZING SEMANTIC REPRESENTATION OF TEXT", filed Mar. 7, 1997 and assigned Ser. No. 08/886,814, both of which have been assigned to the present assignee and incorporated by reference herein.

The output of case or grammatical relation analyzer 106 (illustratively a syntactic analysis corresponding to the sentence under analysis) is provided to constituent identifier and annotator 108. In an illustrative embodiment in which constituents and associated case information are provided by analyzer 106, constituent identifier and annotator 108 includes a predetermined list of case information which identifies cases which tend to be less indicative of the aboutness of the first textual input. In such an embodiment, component 108 includes a software component which receives the output from analyzer 106 and looks for constituents having associated case information which is contained in the predetermined list. Component 108 annotates those constituents which contain the predetermined case information (and thus annotates those constituents which are relatively less related to the aboutness of the document).

In an illustrative embodiment, constituent identifier and annotator 108 includes a predetermined hierarchy of grammatical relations to be identified and a predetermined hierarchy threshold. In one illustrative embodiment, the predetermined hierarchy is the Accessibility Hierarchy set out by Keenan & Comrie and discussed above in the Background section. The threshold is simply defined by a predetermined level or position in the hierarchy. Therefore, all grammatical relations residing below the threshold position in the hierarchy are contained in a predetermined list of grammatical relations. Component 108 annotates the constituents whose grammatical relation falls below the threshold. Thus, constituent identifier and annotator 108 includes a software component which traverses the syntactic analysis provided by grammatical relation analyzer 106 looking for constituents whose grammatical relations are contained in the list of predetermined grammatical relations (and thus corresponding to constituents whose grammatical relations fall below the threshold). Upon identifying a grammatical relation in a sentence passed to the identifier and annotator 108 as one in the predetermined list, component 108 annotates the associated constituent to indicate that it is one whose grammatical relation is contained in the list of predetermined grammatical relations.

In accordance with one aspect of the present invention, the predetermined grammatical relations or case information are those which have been empirically determined to be of little or no use in determining what the overall document or sentence is about. For example, in many instances, the subject of a main clause in a sentence tends to correspond to a reader's intuitive reading of what the sentence or document is about, while an indirect object in a subordinate clause does not. Further, for Japanese, documents containing matched keywords marked with a topic marker "wa" are very often highly relevant, while documents containing keywords with a subordinate marker "no" (which can mark e.g. Partitive, Attributive, Possessive, Appositive) are very often irrelevant. Similarly, in Japanese, several different nominal coordination markers ("ya", "nado", and comma) are used only in an enumeration context (such as "A, B, C, etc"). Documents containing keywords marked with these enumeration markers are very often irrelevant. Such constituent types and case information can be empirically identified according to a suitable test methodology, one of which is described below in greater detail with respect to FIG. 7.

Further, it should be noted that complete syntactic analysis need not be implemented for the crude identification of grammatical relations or cases. Instead, parts of speech and their location in a sentence can be identified more simply. For example, it has been observed that nouns located early in a sentence are often subjects of the sentence. Therefore, if the initial threshold in the Accessibility Hierarchy is set just below subjects, all terms in a sentence after the first noun can be annotated. Other techniques can be used as well. Algorithms which perform part of speech tagging are widely used and well known.

In any event, once the relevant constituents have been annotated, the annotated structure (such as an annotated syntactic analysis) is passed to relationship determination component 104. In the embodiment illustrated in FIG. 3A, component 104 is configured to determine a predetermined relationship between the first textual input provided to analyzer 106 and a second textual input provided to component 104. In one illustrative embodiment, the relationship to be determined is the similarity in meaning between the first and second textual inputs.

In performing that task, component 104 takes into account the annotated constituents (such as in the annotated syntactic analysis) provided by constituent marking component 102. For example, component 104 can simply eliminate the annotated constituents and determine a degree of similarity between the first textual input (with the annotated constituents deleted) and the second textual input. This reduces the amount of comparison and processing required, since the overall text in the first textual input is reduced. Weighting techniques can also be used and are described in greater detail later in the application.

Figure 3B:
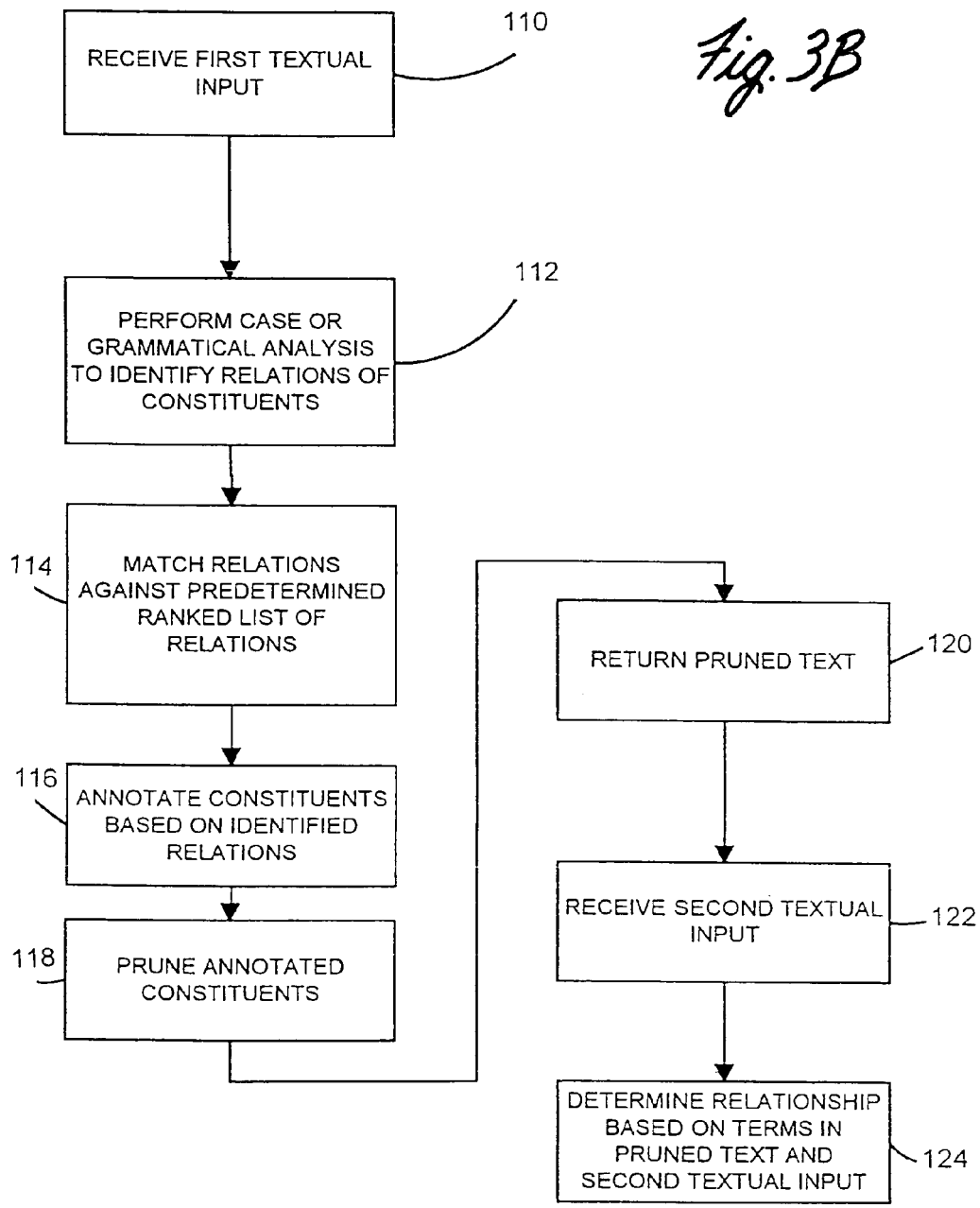
FIG. 3B is a flow diagram illustrating operation of the system shown in FIG. 3A.

FIG. 3B is a flow diagram illustrating in greater detail the operation of system 100 illustrated in FIG. 3A. First, case or grammatical analyzer 106 receives the first textual input. This is indicated by block 110. In one illustrative embodiment, the first textual input is a document under analysis. Analyzer 106 breaks the document at sentence boundaries. In addition, in one illustrative embodiment, analyzer 106 may contain morphological, syntactic and semantic analysis components, or contain no such components, but simply a component which identifies case information or grammatical relations in each sentence. This is indicated by block 112.

Having generated the syntactic analysis (such as that illustrated in Table 1) or relation identifications, analyzer 106 passes that output to constituent identifier and annotator 108. Component 108 compares relations identified against the predetermined list of relations or traverses the syntactic analysis illustrated by Table 1 until it encounters a constituent whose relation is on the predetermined list of grammatical relations (and thus below the predetermined hierarchy threshold). Assuming that, for the example illustrated in Table 1, objects are on the list of predetermined grammatical relations, component 108 traverses the syntactic analysis until it encounters the node which has been identified by grammatical analyzer 106 as an object. Since that grammatical relation appears in the predetermined list of grammatical relations, component 108 annotates that node (and optionally all terms descending from that node) as being contained in the list of predetermined grammatical relations and thus falling below the hierarchy threshold. This annotation is illustrated in Table 1 as "/object". The identification of predetermined grammatical relations and annotation of those grammatical relations is indicated by blocks 114 and 116 in FIG. 3B. Again, the term "relations" as used herein refers to both grammatical relations and cases.

The annotated syntactic analysis (or output containing relation annotations) is then passed to component 104 in FIG. 3A. In an embodiment, for example, where system 100 is determining the similarity between the first and second textual inputs, component 104 can perform a number of operations on the annotated output from component 102. For example, since it has been empirically determined that the annotated terms do not closely correspond to what the first textual input is about, all annotated terms can simply be pruned from the annotated output. This is indicated by block 118 in FIG. 3B.

Once the annotated terms have been pruned, and the second textual input has been received, component 104 simply determines the similarity between the terms remaining in the pruned text and the terms in the second textual input. By way of example, where the first textual input is a document and the second textual input is a query, the content words in the second textual input (the query) are compared against the words remaining in the pruned syntactic analysis corresponding to the sentences in the document in order to determine whether any matches exist. A score is assigned to the document which is based on the number of matches which occur and which is thus indicative of the similarity between the first textual input (the document) and the second textual input (the query). This score is provided at the output of component 104 for use in further processing. Returning the pruned syntactic analysis, receipt of the second textual input, and determining the relationship between the first and second textual inputs are indicated by blocks 120, 122 and 124 in FIG. 3B.

Figure 4:
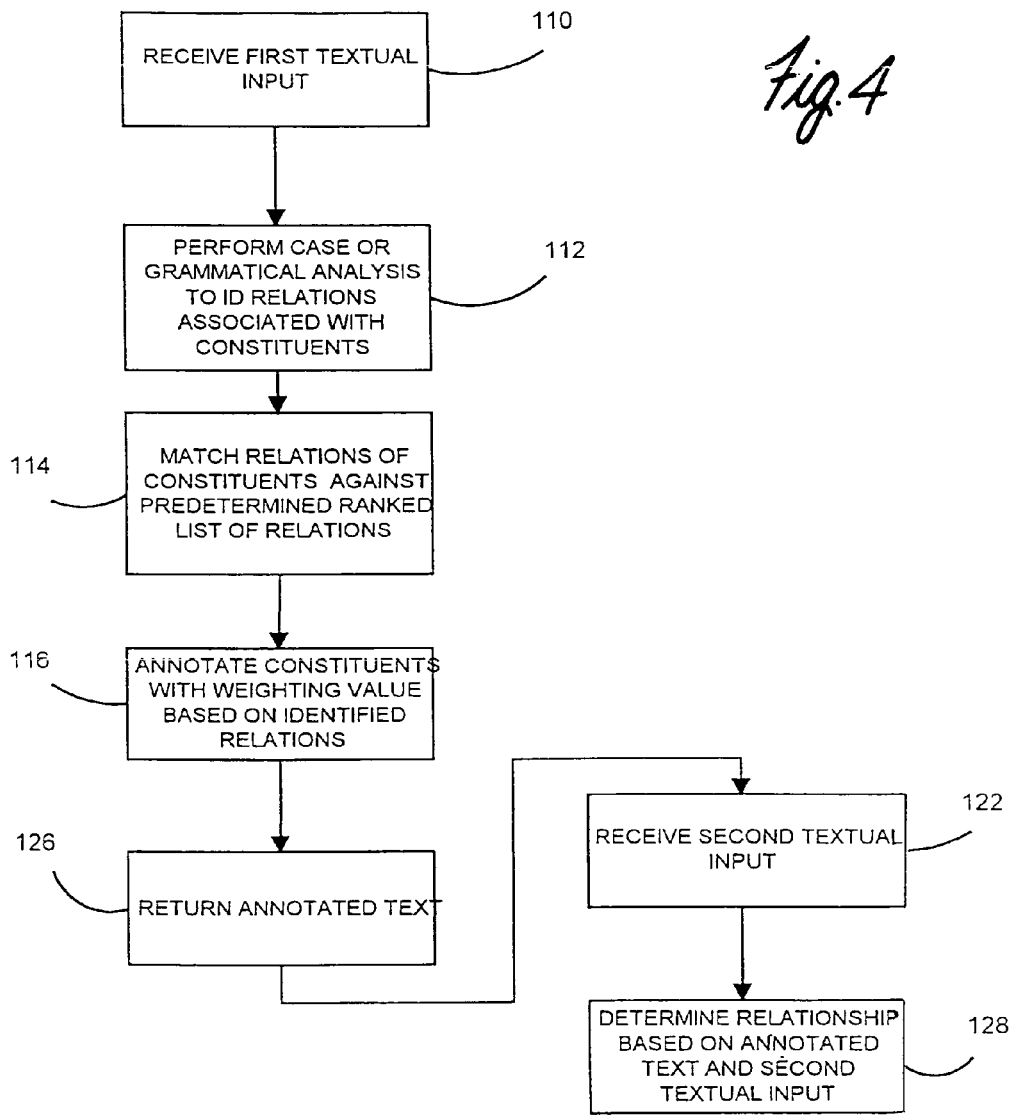
FIG. 4 is a flow diagram illustrating the operation of the system shown in FIG. 3A in accordance with another embodiment of the present invention.

As discussed above, component 104 can perform any number of operations on the annotated output provided by marking component 102, other than simply pruning the annotated terms. FIG. 4 is a flow diagram illustrating an alternative operation in greater detail. A number of blocks are similar to those shown in FIG. 3B, and are similarly numbered. Therefore, system 100 receives the first textual input and performs analysis to identify case information or grammatical relations corresponding to constituents thereof (such as by generating a syntactic analysis), and also identifies whether the constituents have associated relations which correspond to the predetermined relations (such as by locating the relations in the predetermined list or hierarchy of relations). This is indicated by blocks 110, 112 and 114.

However, rather than simply annotating the identified constituents in a binary fashion (as described with respect to FIG. 3B), in the illustrative embodiment shown in FIG. 4, component 108 assigns a weighting value to each of the constituents based upon how closely each constituent is related to the "aboutness" of the first textual input. For example, it may be empirically learned that the subject of a matrix clause is more closely related to the aboutness of the document than an object in a subordinate clause. Alternatively, it can simply be assumed that constituents having associated grammatical relations residing higher in the above-discussed Accessibility Hierarchy are more closely related to aboutness than constituents which have associated grammatical relations located lower in the hierarchy. That being the case, terms in the first textual input are preferentially matched against terms located higher in the hierarchy. One way to accomplish this is to assign varying weights to constituents, based on the location of their corresponding relations in the hierarchy. Once the relations of constituents have been identified during the analysis of the textual input, objects in subordinate clauses may be assigned a very low value (e.g., 0.1 on a scale of 0 to 1) while subjects of matrix clauses may be weighted with a very high value (such as 0.9). The particular weighting value assigned can be empirically, or intuitively, predetermined. Similar weighting can be done based on case information identified. In other words, constituents having associated relations located high on a predetermined ranked list of relations will be given a higher weight than those located lower on the list (assuming that the relation located higher on the list is more closely related to aboutness). This is indicated by block 116 in FIG. 4.

The annotated text (e.g., syntactic analysis) is then returned to component 104, as indicated by block 126. Next, as described with respect to FIG. 3B, the second textual input is received as indicated by block 122, and the relationship between the first and second textual inputs is determined by referring to the annotated (weighted) text, as indicated by block 128.

Summarization and Clustering

The techniques in accordance with the present invention can be used in a wide variety of applications. For example, where the application is to create a summary of a document, the present invention can be used to identify, and eliminate from the summary, clauses or terms which are not related to the aboutness of the document. In that event, system 100 does not include relationship determination component 104 which is used in determining the relationship between first and second textual inputs. Rather, a summary generation component is substituted therefore which is configured to generate a summary based on the annotated or pruned text (e.g., syntactic analysis) returned by component 102.

Similarly, where the application is a document clustering application, system 100 is configured to receive all of the documents to be clustered, and to create annotated texts (e.g., syntactic analyses) based on sentences in each of the documents. Then, relationship determination component 104 simply takes, as its inputs, annotated texts from two or more documents to determine a relationship between the two documents. Relationship scores are computed for all possible pairs of documents, and those with the highest relationship scores are clustered together.

Information Retrieval Prior to Indexing

While all of the above applications can be related to the task of information retrieval, the present invention can also illustratively be directly implemented in an application which performs information retrieval within a computer, across a local area network, or across a wide area network, such as a global computer network. FIGS. 5A-5F illustrate use of the present invention in information retrieval operations in the context of a global computer network, wherein techniques according to the present invention are performed prior to indexing.

Figure 5A:
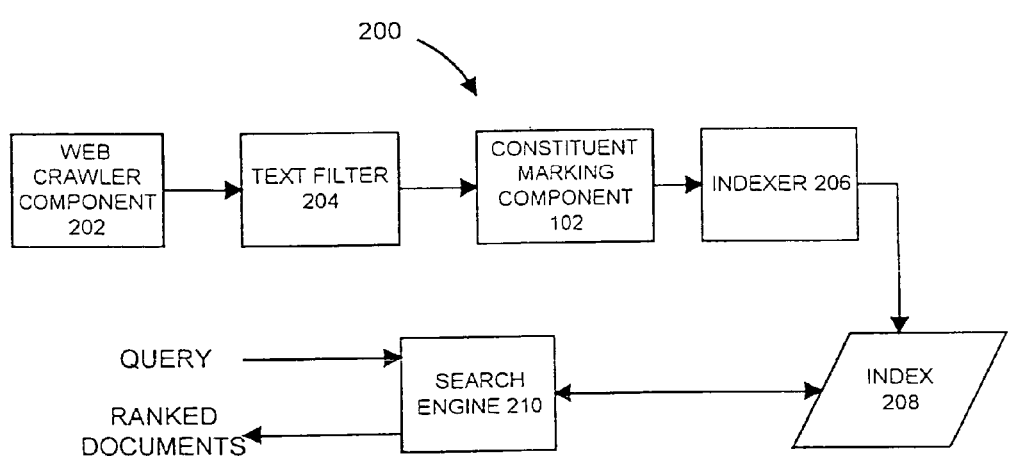
FIG. 5A is a functional block diagram illustrating another system in which the present invention can be used.
Figure 5B:
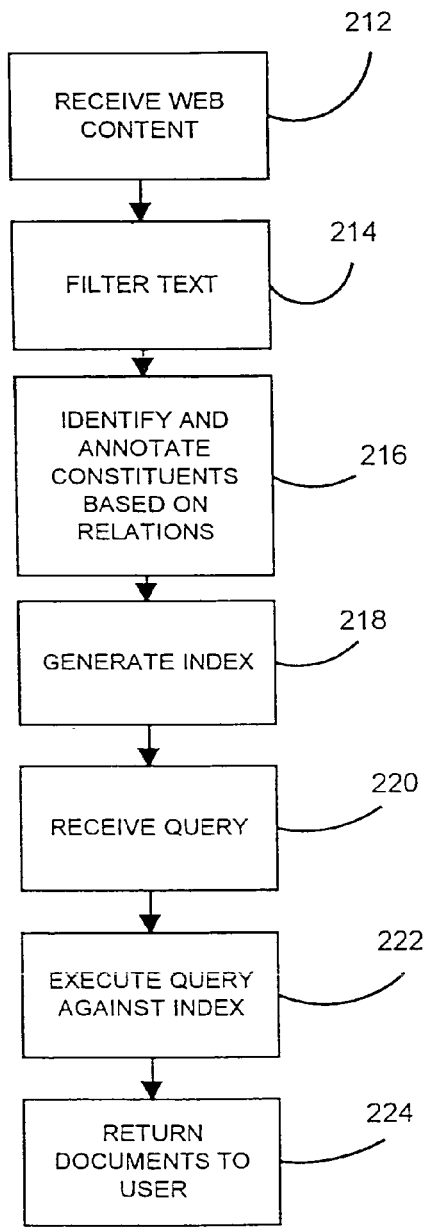
FIGS. 5B-5F are flow and block diagrams illustrating the operation of the system shown in FIG. 5A.

FIG. 5A is a functional block diagram setting constituent marking component 102 (described with respect to FIG. 3A) in the context of Internet information retrieval system 200. System 200 includes web crawler component 202, text filter component 204, constituent marking component 102, indexer 206 and index 208. System 200 also illustratively includes search engine 210. FIG. 5B is a flow diagram which illustrates the operation of system 200.

Web crawler component 202 is a conventional component, illustratively integrated in the operating system of a computer, which periodically accesses predetermined sites on the global computer network and ascertains whether any content has been added to the site which has been accessed. If so, web crawler component 202 provides the content to text filter 204. Text filter 204 is also a conventional component which removes items which are undesirable from an indexing standpoint. For example, in one illustrative embodiment, text filter component 204 removes all HTML tags, and other such items, from the information provided by web crawler 202. Receiving the web content information is indicated by block 212 in FIG. 5B, and filtering the text is indicated by block 214 in FIG. 5B. The filtered information is then provided to constituent marking component 102. Constituent marking component 102 operates in a similar fashion to that described with respect to FIG. 3A. In other words, constituent marking component 102 illustratively includes a sentence breaker which breaks the text provided at its input at sentence boundaries. Component 102 also preferably includes case or grammatical analysis functionality which parses the sentences and provides an output which identifies relations (i.e., case information or grammatical relations) and compares them against the predetermined, ranked list or places them in the predetermined hierarchy. Component 102 also illustratively includes constituent identifier and annotator 108 which receives the output provided by the case or grammatical relation analyzer to annotate constituents based on their case information or position in the predetermined hierarchy.

Constituents having associated predetermined case information or grammatical relations residing below a predetermined hierarchy threshold can be pruned or some or all of the constituents can be annotated with a weighting value as discussed above. Identifying and annotating the constituents is indicated by block 216 in FIG. 5B.

The terms in the annotated or pruned text are then provided to indexer component 206. Indexer 206 can take any number of suitable forms, such as being incorporated in search engine 210 described below and as described in greater detail with respect to FIGS. 5C-5F below. However, suffice it to say that indexer 206 generates an index corresponding to the documents retrieved by web crawler component 200 and provides the index 208 at its output. Index 208 can be a simple statistical, keyword-type index, or a more sophisticated type of index, depending upon indexer 206. Generation of the index is indicated by block 218 in FIG. 5B.

Search engine 210 is configured to receive a user input query and to execute that query against index 208. In one illustrative embodiment, search engine 210 also performs the indexing operation described with respect to indexer 206. In such an embodiment, search engine 210 is an Internet search engine, such as Alta Vista (which is a registered trademark of Digital Equipment Corporation of Maynard, Mass.), and is connected to a mass data store containing index 208. The data set of document records is illustratively indexed by indexer 206 which can be contained in the search engine. Each such record in index 208 typically contains a web address (commonly referred to as a uniform resource locator "URL") at which a corresponding document can be accessed by a web browser, predefined content words which appear in that document along with, in certain engines, a relative address of such word relative to other content words in that document; a short summary (often just a few lines) of the document or a first few lines of the document; and, possibly, the description of the document as provided in its hypertext markup language (HTML) description field.

When a user enters the query through, for example, a web browser, the browser passes the query through an Internet connection to a server which contains the search engine 210. The search engine 210 processes the query against document records stored within index 208 to yield a set of retrieved records (for documents) that the engine 210 determines to be relevant to the query.

In one embodiment, search engine 210 compares the content words in the query against content words in document records indexed in index 208. Based on the number of matches, the documents are assigned a score and ranked. The ranked documents are output to the user by search engine 210. Receiving and executing the query is indicated by blocks 220 and 222 in FIG. 5B, and returning the documents is indicated by block 224.

Of course, it should be noted that search engine 210 can be a more complex type of search engine. In that case, search engine 210 may perform natural language processing on the query, or on the returned documents, or on both, prior to providing any documents to the user. Other types of search engines are contemplated as well.

Figure 5C:
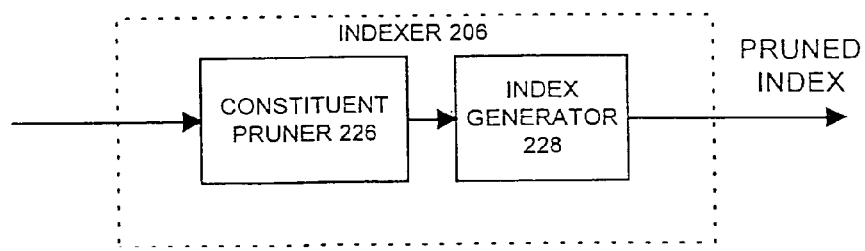

FIG. 5C is a more detailed block diagram of indexer 206 in accordance with one illustrative embodiment of the present invention. In FIG. 5C, indexer 206 includes constituent pruner component 226 and index generator component 228. In the embodiment illustrated in FIG. 5C, the index 208 to be generated is simply a statistical keyword type index, and index generator 228 is a conventional index generator for generating such an index based on a textual input. In that case, constituent pruner 226 operates to prune, or strip out, all annotated constituents or terms which are provided by constituent marking component 102 (and which contain the predetermined case information or which fall below the grammatical relation hierarchy threshold), and to provide the remaining terms to index generator 228. Therefore, all aspects of system 200 (other than constituent marking and pruning, but including index generation) can be accomplished with conventional components. The textual inputs are simply provided to marking component 102, and pruner 226, after they have been filtered by component 204, and prior to indexing by index generator 228. Components 102 and 226 act to identify and eliminate from indexing, terms and clauses which have little or no relationship to the aboutness of the document being indexed. This significantly reduces the size of index 208, without compromising performance across the precision and recall dimensions.

Figure 5D:
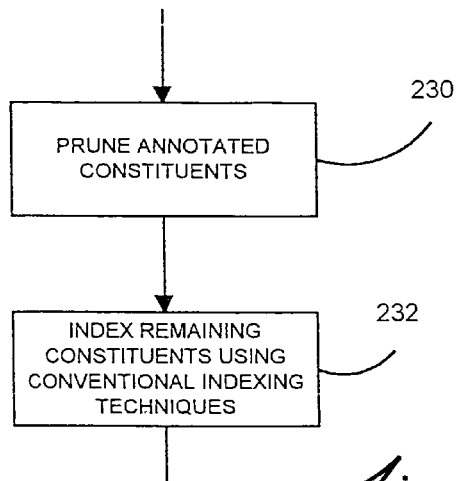

FIG. 5D is a flow diagram which illustrates the operation of indexer 206 shown in FIG. 5C. Pruning the annotated constituents is indicated by block 230 in FIG. 5D, and indexing the remaining terms using conventional indexing techniques is indicated by block 232 in FIG. 5D.

Figure 5E:
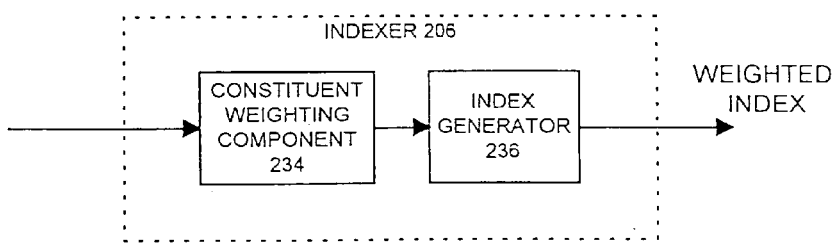
Figure 5F:
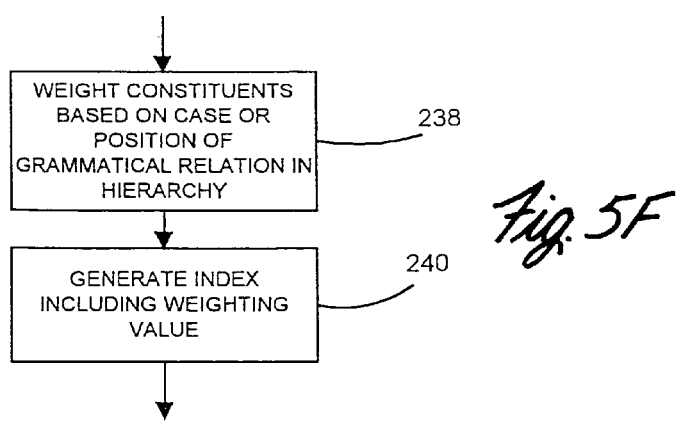

FIG. 5E is a functional block diagram illustrating another illustrative embodiment of indexer 206, and FIG. 5F is a flow diagram illustrating the operation of indexer 206 shown in FIG. 5E. Indexer 206 in FIG. 5E includes constituent weighting component 234 and index generator 236. Constituent weighting component 234 receives the annotated output from component 102 and weights the terms in the annotated output, or weights certain of the terms. The weighting can be accomplished using a binary type scale or a continuous scale.

For example, term weighting component 234 can be configured to simply add a predesignated marking to all words in an annotated syntactic analysis. In other words, all words in the syntactic analysis which have grammatical relations located above the hierarchy threshold can be prepended with a "g_" indicating that those words represent a good match. Similarly, all annotated words contained within the syntactic analysis (and thus having grammatical relations located below the hierarchy threshold) can be prepended with a "b_" indicating that they correspond to a bad match, or a match which does not necessarily indicate that the two textual inputs are similar. Similar markings can be made based on the predetermined, ranked list of case information.

By way of example, assume the grammatical relation hierarchy threshold is set such that all terms in the hierarchy below subjects are below the threshold. Then, if "dog" is a word contained in the syntactic analysis which is a subject, term weighting component 234 receives the term "dog" and generates at its output the term "g_dog", which is indexed. Similarly, if the term "bone" is located within the syntactic analysis and is a direct object, then weighting component 234 receives the term "bone" at its input and generates at its output the term "b_bone". All of these terms are provided to index generator 236 which, in that embodiment, simply generates a statistical keyword type index using the words with the prepended terms.

Then, when the user provides the query to search engine 210, search engine 210 is configured to prepend each content word in the query with the term "g_". Search engine 210 then identifies matches between only terms in the index and query which represent a good match. Thus, preferential matching is accomplished against only terms which are subjects or topic words in the document.

Again, it should be noted that index generator 236 can, in that embodiment, be implemented as a conventional index generator which simply generates a keyword-type index 208 without any special modification. In the above-described embodiment, index 208 does not achieve the space reduction advantages which are achievable using the present invention, but it does achieve increased precision advantages in accordance with the present invention.

In an alternative embodiment, term weighting component 234 weights the terms in the annotated output received from component 102 with a continuous, or semi-continuous weighting scheme. In that event, term weighting component 234 is configured to place a weight by each annotated constituent indicating the expected relevance which the constituent has to the aboutness of the document, based on empirical analysis of case, or based on its position in the predetermined grammatical relation hierarchy. For example, if empirical results show that a certain constituent having associated grammatical relation located high in the predetermined hierarchy is highly related to the aboutness of a document, a weight can be appended to that constituent which indicates, for example, a 90% confidence level that the term is relevant. This weight is added to the terms in the annotated syntactic analysis by term weighting component 234.

Index generator 236, in that embodiment, is configured to create index 208 which not only includes the terms provided to index generator 236, but which also includes the weight value added by term weighting component 234. Thus, search engine 210 is configured to not only look for matches between content words in the query and those contained in index 208, but to compute the score for similarity between the document and the query based on the number of matches found (and any other desirable criteria) and also based on the weight assigned to the matching terms.

In another alternative embodiment, an existing indexing technique is used, with the addition of one item. A number of existing indexing techniques index a document based on the word, the position of the word within the document, and the capitalization of the word (i.e., whether the word is capitalized or not capitalized). This type of indexing scheme can be used in accordance with the present invention including term weighting component 234 by simply adding one additional entry into the index. That entry corresponds to the weight value assigned by term weighting component 234. The weight can be empirically determined, or can be determined using a conventional technique such as term frequency-inverse document frequency (tf*idf). In any event, term weighting component 234 provides the weight value to index generator 236 which builds the index based on the term, the position, the capitalization and the assigned weight value, and any other conventional entries used in the indexing scheme. Weighting the terms or constituents based on the annotation is indicated by block 238 in FIG. 5F, and generation of the index including the weighting information is indicated by block 240.

Figure 6A:
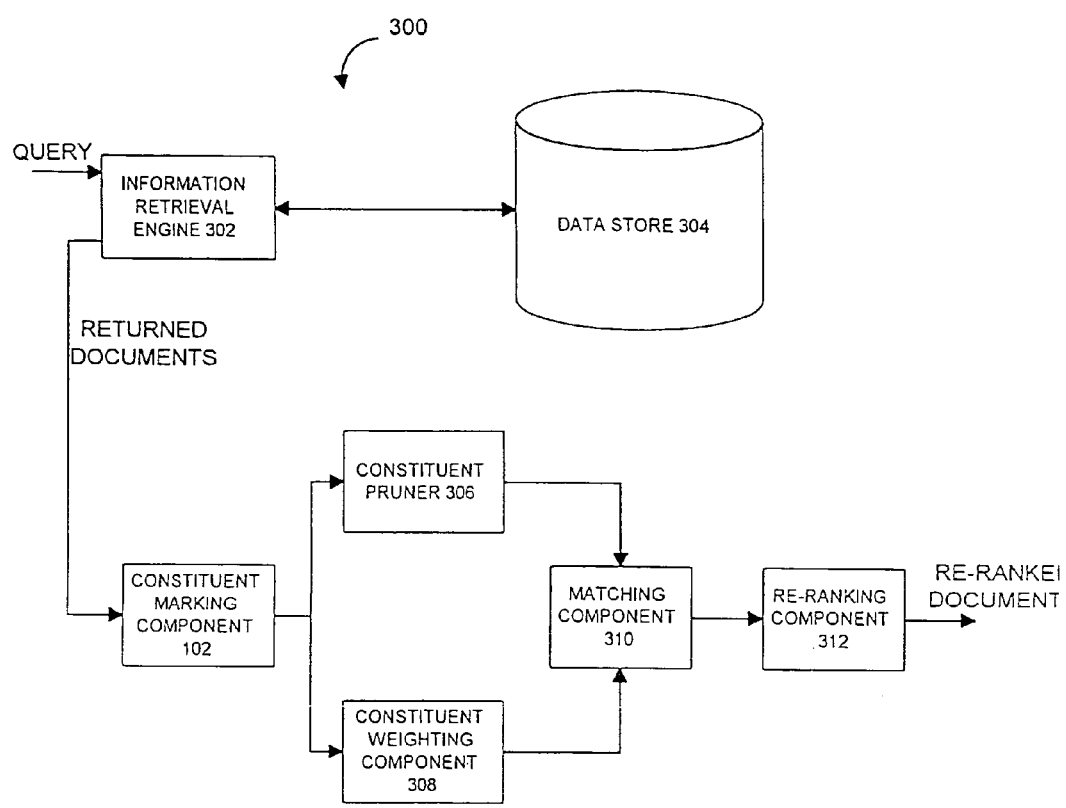
FIG. 6A is a block diagram illustrating another system in which the present invention can be used.

Information Retrieval Operations, Performed on Documents Returned in Response to a Query The present invention can also be used in post processing operations (i.e., in operations which occur upon the document set returned by a conventional search engine in response to a query). FIG. 6A is a functional block diagram illustrating constituent marking component 102 in the context of a post processing information retrieval system 300. System 300 includes a conventional information retrieval engine 302 which can be implemented as a simple statistical information retrieval engine, or as one which includes more complex natural language processing techniques. Data store 304 represents the data store being searched based upon a user query input to information retrieval engine 302. Data store 304 can, for example, be within a computer, on a local area network, or on a wide area network (such as a global computer network). Similarly, data store 304 can simply be an index of documents to be searched. System 300 also includes constituent pruner component 306 or, optionally, constituent weighting component 308. System 300 further includes matching component 310 and re-ranking component 312.

Figure 6B:
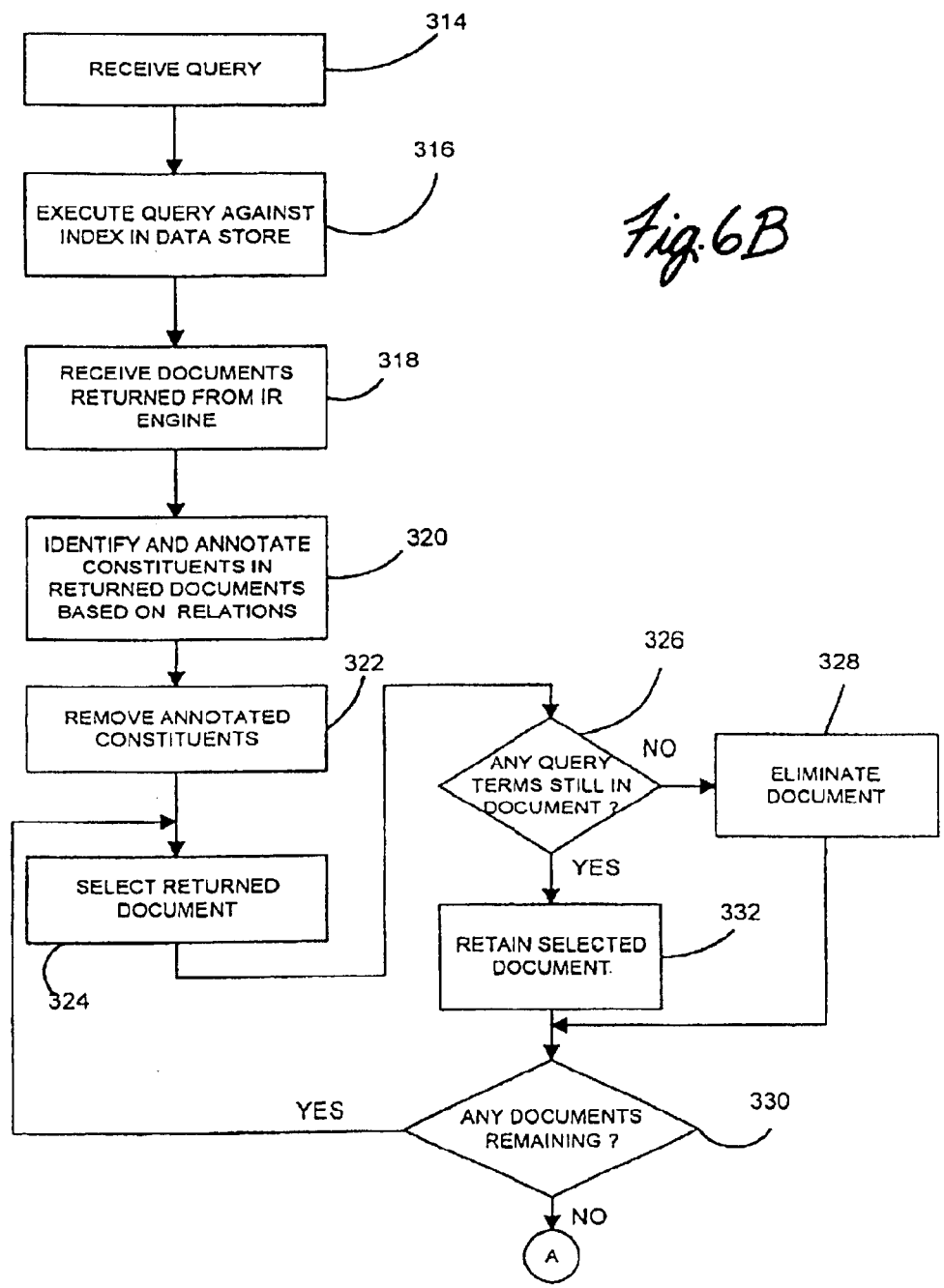
FIGS. 6B and 6C are flow diagrams illustrating the operation of the system shown in FIG. 6A in accordance with one embodiment of the present invention.
Figure 6C:
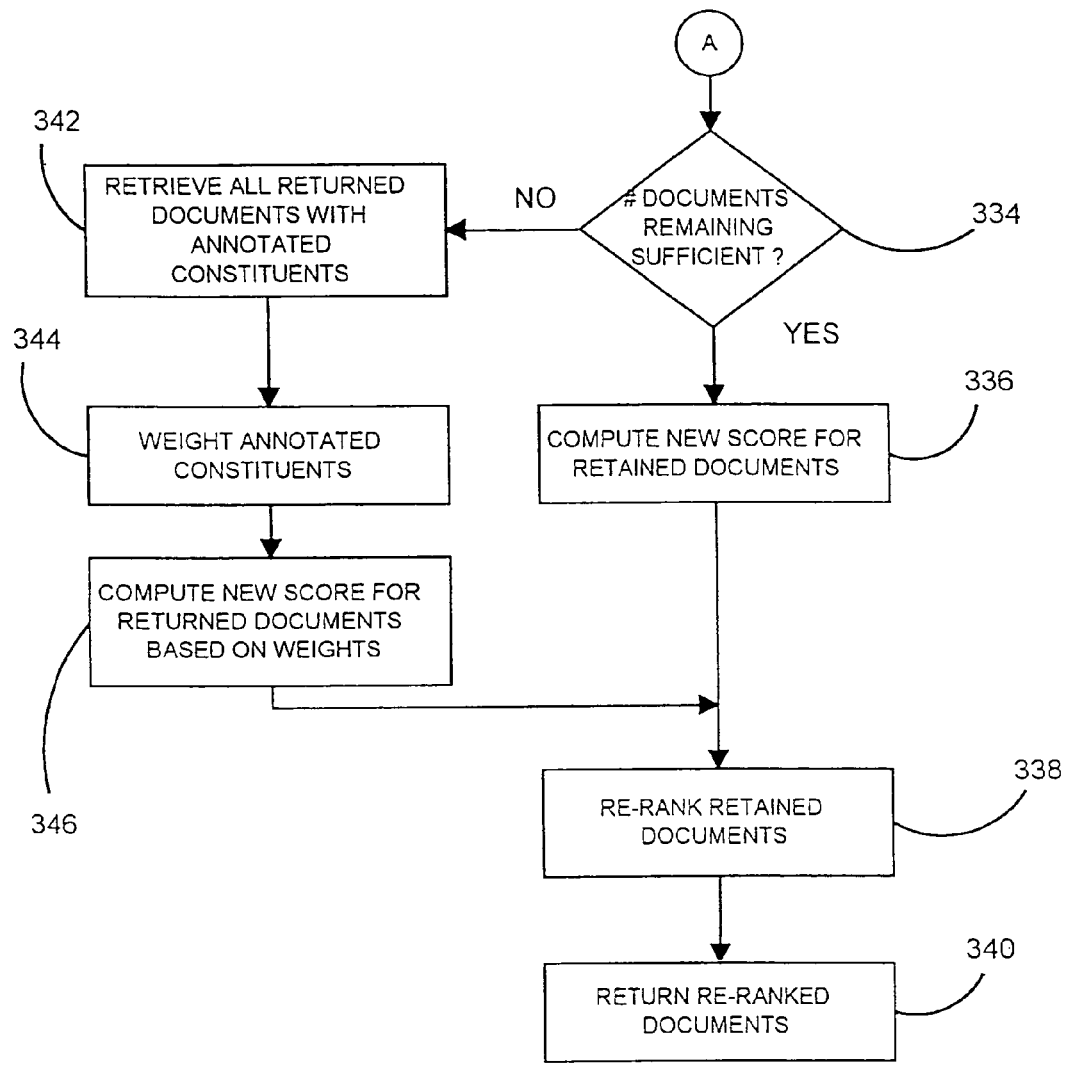

FIG. 6B is a flow diagram which illustrates the operation of system 300 shown in FIG. 6A.

In operation, information retrieval engine 302 first receives a query input by the user. This is indicated by block 314 in FIG. 6B. Next, information retrieval engine 302 executes the query against the data store 304 in a conventional manner. This is indicated by block 316 in FIG. 6B. Similarly, in a conventional manner, information retrieval engine 302 receives and returns the documents which are deemed by engine 302 to be relevant to the user's query. This is indicated by block 318.

In accordance with one embodiment of the present invention, the returned documents are then provided to constituent marking component 102 which is similar to that described with respect to FIG. 3A. The annotated constituents are then provided, in one illustrative embodiment, to constituent pruner 306. Pruner 306 prunes the annotated constituents from the annotated output provided by marking component 102. The pruned output is then provided to matching component 310. Identifying and annotating the constituents based on case or the location of associated grammatical relation in the predetermined hierarchy is indicated by block 320 in FIG. 6B, and pruning those constituents is indicated by block 322.

Matching component 310 selects a first of the returned documents, with the annotated constituents removed therefrom. This is indicated by block 324. Matching component 310 then determines whether any of the content terms in the query provided by the user are still in the selected document, after the annotated constituents have been removed. If not, that indicates that the only matches against the selected document occurred with respect to constituents which contained the predetermined case information or which had grammatical relations located below the predetermined hierarchy threshold (i.e., those which have little to do with describing what the document is about). This is indicated by block 326 in FIG. 6B.

Therefore, the document is eliminated from the list of returned documents, as indicated by block 328, and matching component 310 determines whether any documents remain in the returned document set. This is indicated by block 330.

If, at block 326, some of the content terms in the query are still found in the selected document, after the annotated constituents have been removed therefrom, that indicates that matches have been made against the document with respect to terms that are believed to be relevant to the aboutness of the document. Therefore, the selected document is retained as indicated by block 332. Again, matching component 310 determines, at block 330, whether any of the returned documents have yet to be analyzed. If so, processing returns to block 324.

After all of the returned documents have been analyzed, the remaining documents (those which have not been eliminated) are passed to re-ranking component 312. Re-ranking component 312 first determines whether the number of remaining documents is sufficient to present to the user. This is indicated by block 334. In other words, it is possible that the content terms of the query matched relevant terms in only a very small number of the returned documents. If that is true, re-ranking component 312 may determine that the number of documents presented to the user is undesirably low, or is insufficient. This threshold can either be set by the user, or can be automatically determined based on a threshold value preprogrammed into component 312.

In any event, if the number of documents remaining is sufficient, as determined at block 334, then re-ranking component 312 computes a new score for the retained documents. The new score can be computed in any suitable fashion. For example, the new score may be based on the number of matches between content words in the query and terms remaining in each of the documents, after the annotated constituents have been removed. Computation of the new score is indicated by block 336. Based upon the new score, re-ranking component 312 re-ranks the retained documents in an order determined by the new score. This is indicated by block 338. Finally, component 312 returns the re-ranked documents to the user in re-ranked order. This is indicated by block 340.

If, at block 334, it is determined that an insufficient number of documents remains to present to the user, then processing continues at block 342. Re-ranking component 312 retrieves all documents returned from information retrieval engine 302 in response to the query input by the user. Instead of removing the annotated constituents as indicated by block 322, re-ranking component 312 feeds the documents back to optional constituent weighting component 308. Weighting component 308 weights the annotated constituents which had previously been removed (and may weight all other constituents as well) based on their case or positions of their grammatical relations in the predetermined hierarchy. The weighted outputs are then fed back to matching component 310 which again matches the content words in the query against the terms in the documents, including annotated terms which have been weighted. This is indicated by block 344. A new score is then computed for each of the returned documents based on the weights, and the documents are again re-ranked. This is indicated by block 346. The documents are then provided to the user as indicated by block 340.

It should also be noted that, at block 344, instead of weighting the annotated constituents, constituent weighting component 308 can simply remove the annotations which essentially weight all the terms the same. Then, matching component 310 simply matches against the same terms which information retrieval engine 302 matched against. Further, rather than removing the annotations from all documents, the annotations can simply be removed at block 344 from those documents which were eliminated from the search at block 328. Therefore, the annotations are simply removed from those documents which information retrieval engine 302 had already determined were relevant enough to return to the user. Those documents are then simply ranked lower than the documents which remained even with the annotated constituents removed.

It should be noted that the discussions herein which relate to information retrieval proceed using the term "content word." This term is used for the sake of illustration only. It is contemplated that the particular linguistic unit under analysis can be any other unit, such as morphemes, words, phrases, n-grams of characters, etc., all of which are referred to herein as "search terms."

Test Methodoloqy

Figure 7:
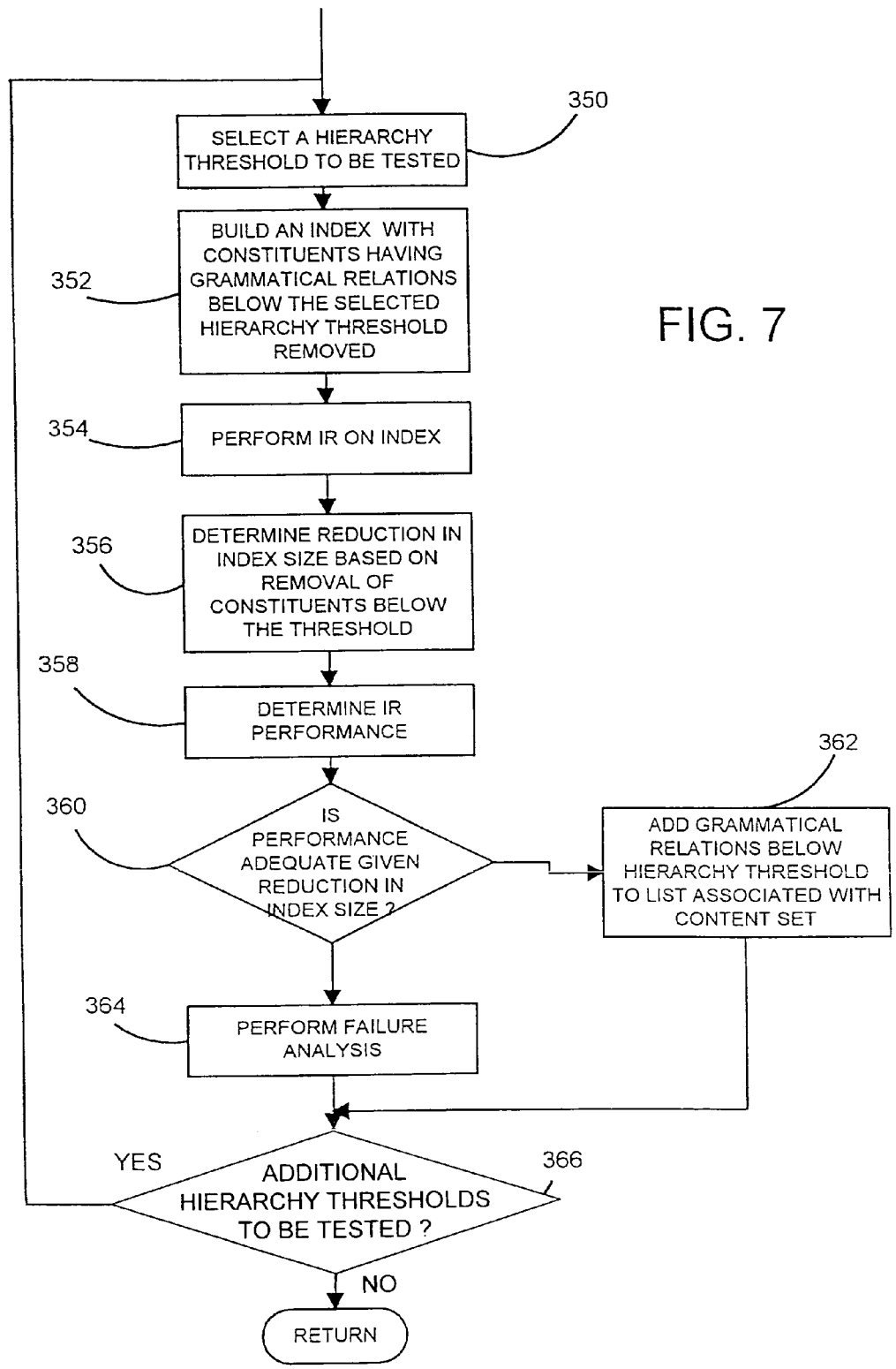
FIG. 7 is a flow diagram illustrating a test methodology used in accordance with one embodiment of the present invention.

One embodiment of the present invention also includes a system by which the pertinent case information (or ranked list of case information and corresponding threshold) or grammatical relation hierarchy and hierarchy threshold can be predetermined based on any given data set with which the present invention is utilized. FIG. 7 is a flow diagram which illustrates operation of computer 20 in implementing such a system. While the technique described below can be used to identify case information and both the grammatical relation hierarchy to be used and the hierarchy threshold, the following discussion proceeds primarily with respect to setting the hierarchy threshold with respect to a predefined hierarchy. It should also be noted that a content set can be any suitable collection of documents or any other text corpus which can be searched using information retrieval-type techniques.

First, a grammatical relation hierarchy threshold is selected. The hierarchy against which the threshold is set can be any suitable hierarchy such as the Accessibility Hierarchy described above or another empirically determined or intuitively determined hierarchy or one determined using the same technique as that described herein for setting the threshold. The initial threshold can be set essentially any position along the hierarchy.

It is believed that the particular hierarchy and hierarchy threshold which may prove to be helpful in performing techniques in accordance with the present invention may change with different content sets. Assuming a hierarchy has been selected, in order to identify the hierarchy threshold to be used in accordance with the present invention, as the predetermined hierarchy threshold, a first hierarchy threshold to be tested is selected. This is indicated by block 350 in FIG. 7.

Next, an index is built from a predetermined text corpus with all of the constituents having associated grammatical relations falling below the selected hierarchy threshold removed therefrom. This is indicated by block 352. In accordance with one illustrative embodiment of the present invention, the text corpus is approximately 20,000-30,000 documents pertaining to the desired content set.

Next, information retrieval is performed on the index. This is indicated by block 354. In one illustrative embodiment, information retrieval is performed using approximately 20,000-30,000 predetermined queries.

Next, constituents in the content set which have an associated grammatical relation falling below the selected threshold are identified and a determination is made as to how useful the remaining constituents (other than those falling below the threshold) are in determining the meaning of the content set. Of course, this can be done in any number of ways such as observing knowledge about the contact set gained by readers of the constituents which reside above the threshold.

Another way is to use information retrieval. This discussion proceeds with respect to an illustrative embodiment which uses information retrieval. In that embodiment, computer 20 determines how much of an index space saving has been realized by removing the constituents having grammatical relations falling below the selected threshold from the document corpus. This is indicated by block 356. Computer 20 then determines the performance of the information retrieval operations performed against the index. This is indicated by block 358. In order to determine whether performance is adequate, any suitable measure which includes precision and recall components can be used. One suitable measure is known as "F-measure" and was defined in a paper written by C. J. Van Rijsbergen, 1979, entitled "INFORMATION RETRIEVAL." The F-measure is defined as follows:

$$F = ((B^2 + 1.0) * P * R) / (B^2 * P + R)$$

where P is precision, R is recall and B is the relative importance given to recall over precision. Usually, B=1.

Next, computer 20 determines whether the performance is adequate given the reduction in index size. This will differ, of course, with application. In applications in which index size is of great importance, a greater reduction in information retrieval performance may be tolerated. For purposes of the present discussion, a statistically significant change in F-measure can be defined by a change of five percent or more.

In any event, it is decided whether the performance is adequate given reduction in index size at block 360. If so, the selected threshold is logged and grammatical relations falling below the threshold are added to the list of predetermined grammatical relations associated with the content set under analysis. This is indicated by block 362.

However, if, at block 360, it is determined that performance is not adequate given the reduction in index size, failure analysis is performed to determine why documents were not returned that should have been, or why documents were returned that should not have been. This is indicated by block 364. Illustratively, this is determined by a group of linguists who analyze the documents returned, or documents which should have been returned, but were not, to determine what the documents have in common, and hence to determine why the documents were not returned, or were incorrectly returned. In performing this analysis, the linguists may add some further refinement to the hierarchy threshold (or hierarchy structure) such that constituents are only removed under certain circumstances, or in certain contexts, even if they have associated grammatical relations which fall below the threshold. Similarly, the linguists may simply determine that the selected threshold (or hierarchy structure) is not desirable, given the content set. In any case, computer 20 then determines whether additional thresholds (or hierarchy structures) are to be tested. If so, processing returns to block 350 and a new threshold is selected. If not, all thresholds which are to be tested have been tested, and the predetermined threshold has been selected. This is indicated by block 366.

The hierarchy structure can also be determined according to this general process. Constituents having a selected grammatical relation are removed from the corpus and a quantitative indication of usefulness of the remaining constituents is obtained (such as by performing information retrieval on an index formed based on the pruned corpus). The grammatical relation which has the greatest usefulness (e.g., results in the greatest reduction in information retrieval performance) is arranged highest in the hierarchy. Remaining grammatical relations are arranged in descending order, based on reduction in usefulness (e.g., a reduction in information retrieval performance).

Further, this general process can be used to select case information to be used in the predetermined, ranked list. For example, in the illustrative information retrieval embodiment, a particular case is selected, terms having the selected case are annotated and removed, and an index is built with the remaining terms. Information retrieval is performed on the index and performance is analyzed. Based on a reduction in performance, cases are placed in a ranked list. The threshold within the ranked list can also be set based on reduction in information retrieval performance. Further analysis can be performed where performance is inadequate. The process can be repeated for any desired case information.

Thus, it can be seen that the present invention identifies relations (case information or a grammatical relation hierarchy and a hierarchy threshold). Constituents with the associated case information or having grammatical relations located below the hierarchy threshold are identified so they can be annotated, weighted, or simply removed when determining what a document is about. This can be utilized when a document is indexed during information retrieval, when a document is being summarized, after a document has been retrieved using conventional information retrieval techniques, when documents are to be clustered, or with an implicit query in which a document is provided and a computer is requested to find similar documents. The present invention can be utilized in other contexts as well. However, it has been found to be particularly beneficial in information retrieval indexing since the present invention can greatly reduce the index size without significantly sacrificing performance.

Although the present invention has been described with reference to preferred embodiments, workers skilled in the art will recognize that changes may be made in form and detail without departing from the spirit and scope of the invention.

What is claimed is:

1. A computer readable medium storing an index of textual material used to enable a computing device to determine a relationship between first and second textual inputs, the index comprising a data structure including:
   a plurality of constituents from the textual material, the plurality of constituents having a predetermined usefulness in determining the relationship based on case information corresponding to the constituents in the textual material, or relations of constituents in the textual material.

2. The computer readable medium of claim 1 wherein the predetermined usefulness corresponds to a location of the case information corresponding to each of the plurality of constituents on a predetermined hierarchy.

3. The computer readable medium of claim 1 wherein the textual material includes a plurality of sentences, and wherein the index comprises:
   a portion of a syntactic structure corresponding to each of the plurality of sentences, each syntactic structure being indicative of the grammatical relations of constituents in the corresponding sentences.

4. The computer readable medium of claim 1 wherein the predetermined usefulness corresponds to a location of grammatical relations corresponding to each of the plurality of constituents on a predetermined hierarchy.

5. A computer readable medium storing an index of textual material used to enable a computing device to determine a relationship between first and second textual inputs, the index comprising a data structure including:
   a plurality of constituents from the textual material, the plurality of constituents having predetermined characteristics indicative of usefulness in determining the relationship and being annotated with annotations indicative of the usefulness.

6. The computer readable medium of claim 5 wherein the constituents are annotated with a binary annotation indicating whether the constituents have corresponding grammatical relations located above a hierarchy threshold on a predetermined grammatical relation hierarchy.

7. The computer readable medium of claim 5 wherein the constituents are annotated with a weight value indicative of the usefulness of the constituents in determining the relationship.

8. A computer-implemented method of utilizing an index comprising:
   identifying first constituents in a first textual input having relations indicative of usefulness in determining a relationship between the first textual input and a second textual input; and
   generating the index based on the constituents identified; and
   utilizing the index to determine a relationship between the first and second textual inputs.

* * * * *